Figure 1:
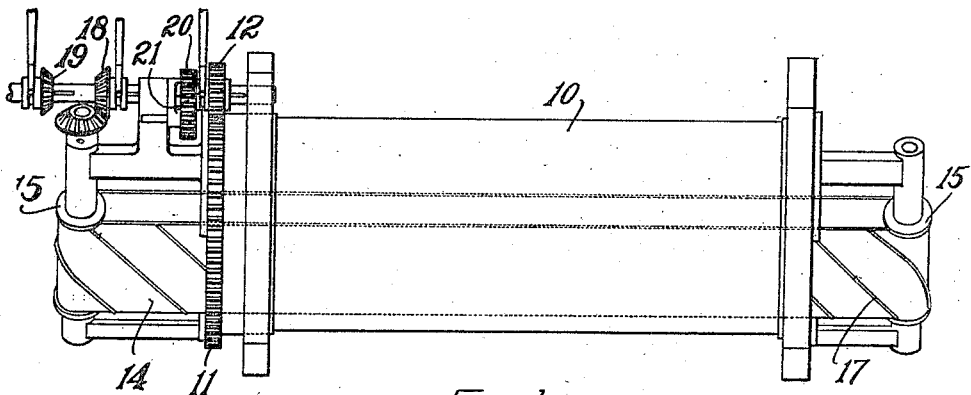

G. H. PETRI.
FORMING MACHINE.
APPLICATION FILED AUG. 10, 1909.

1,141,884.

Patented June 1, 1915.

WITNESSES
Joseph T. Brennan.
Mary A. O'Brien.

INVENTOR
GUNTHER H. PETRI
BY HIS ATTORNEYS
Mitchell, Chadwick & Kent

UNITED STATES PATENT OFFICE.

GUNTHER H. PETRI, OF BOSTON, MASSACHUSETTS.

FORMING-MACHINE.

1,141,884.  Specification of Letters Patent.  Patented June 1, 1915.

Application filed August 10, 1909. Serial No. 512,141.

*To all whom it may concern:*

Be it known that I, GUNTHER H. PETRI, a citizen of the United States, residing at Boston, in the county of Suffolk and State of Massachusetts, have invented new and useful Improvements in Forming-Machines, of which the following is a specification.

This invention relates to improvements in forming machines. More particularly it relates to mechanism for rounding-up dough into balls preparatory to proofing and molding.

The object of the invention is to provide improved and simplified apparatus for the purpose described.

The mechanism comprises only two moving parts and means for driving them. An endless belt conveyer runs endwise through a rotating hollow drum or cylinder, and the invention relates especially to the arrangement of the conveyer with respect to the drum, viz., by tipping it transversely at a considerable angle from the horizontal.

An embodiment of the invention is illustrated in the drawings, in which—

Figure 2:
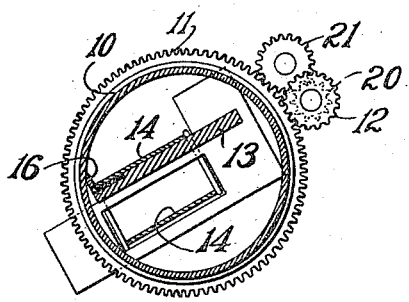

Figure 1 is a plan; and Fig. 2 is an end elevation in section.

Referring to the drawings, 10 represents a hollow drum which may be supported in any suitable bearings rotated by any suitable means, the means represented being a gear 11 on the drum driven by pinion 12. Extending through this drum is a plate 13 adapted to sustain one portion of an endless belt 14 which passes longitudinally through the drum and is driven and guided by guide pulleys 15 at each end. This plate and the axes of these pulleys 15 are set at an angle having a considerable dip below a horizontal plane, as indicated in Fig. 2, and the plate and belt resting thereon are placed somewhat above the axis of the drum, so that this dip runs toward that portion of the drum-wall which is about horizontally on a plane with the axis of the drum, as shown in Fig. 2. The belt and plate are placed with one edge adjacent to this drum-wall, and the scraper 16 is fixed in position at the lower side of the plate, intervening between the drum and the belt, and serving both to scrape the drum surface and to hold the belt from sliding into contact with the drum surface. The direction of rotation of the drum is such that it moves downward toward this scraper and lower side of conveyer. An angle is thus formed between the drum surface and the belt which is somewhat like a V in shape, being composed of two converging surfaces, viz., the interior of the drum and the top of the conveyer. Both of these surfaces are continually in motion, the drum surface downward, and the conveyer surface endwise from the drum; and the force of gravity is also constantly present. Consequently, when a mass of dough is placed on the belt at one end of the apparatus, it is subjected to three forces. The belt surface pulls it inward and continuously onward through the drum; gravity pulls it downward while resting on the belt, toward the drum surface; and the drum pulls the side of the mass downward. The result of these motions is rotation of the mass and its gradual formation into a ball. A variation of this may be effected by causing the drum to rotate in the opposite direction, i. e., upward from the lower edge of the belt. The effect of the drum then is to raise the outer side of the mass of dough, causing it to rotate or roll upward on the belt. Gravity keeps it down, always in contact between the drum and the belt. In this way there is less compression and more rounding action. If desired, the belt may be provided with oblique ribs 17, the effect of which is either to tend to force the dough more firmly into the V between the belt and drum or to raise it more effectively out of said V, according to the way the belt is driven. These various effects may be attained in the mechanism illustrated as follows: the movement of the drum in either direction by taking power direct through gear 12, or reversely through gears 20 and 21, the system of gears being slidable on the shaft for this purpose, thus applying the driving power with suitable direction of rotation; the reversal of the belt, provided with the ribs 17, by reversing the gear between the driving mechanism of the drum and that of the belt. Any suitable or ordinary contrivance may be applied for this, and the drawing illustrates two gears 18, 19 oppositely beveled, sliding on the same shaft, each adapted to engage the driving gear 20 of the belt.

By the various adjustments possible in this apparatus, varying degrees of compression upon the dough may be obtained during the forming process, for example, by rotating the drum downward toward the line where the belt is adjacent to it, and by driving the belt with the ends of its ribs which are remote from this line in advance, the greatest compression is obtained, as both ribs and drum are tending to force the dough into the contracted space formed between the drum and belt. By driving these two parts both in the opposite direction, the minimum compression is attained; and intervening steps may be attained by reversing the direction of one or the other. It will be observed that this mechanism is capable of handling dough masses of various sizes, and that with a greater mass the pull of gravity is greater and also the bearing surface of the drum upon the mass is greater so that it may be desirable to use a smaller compressive arrangement of the mechanism with larger masses of dough. It is also possible to double the capacity of the apparatus by feeding dough masses at one end of the drum on top of the conveyer belt 14 and at the other end of the drum feeding them into the drum underneath the oppositely moving portion of the belt. Referring to Fig. 2, and supposing the drum to be moving upward on the left hand side, the masses then fed into the space under the belt would be carried by the drum to the left, into contact with the belt 14 and thus would receive a composite rotation due to the joint action of these two moving parts, to which the action of the ribs 17 on the underside of the belt would be added; and these masses would be carried through the drum and discharged in the opposite direction from those resting on top of the belt 14, as heretofore described. By this means, i. e., by passing the returning portion of the belt through the drum in suitable relation thereto to engage the tops of dough masses, the capacity of a single machine may be largely increased.

I claim:

1. A forming machine for plastic masses comprising a rotating hollow drum and a continuous surfaced conveyer passing therethrough adjacent to the drum-wall, said conveyer being set at an incline transversely downward to its edge, said edge being adjacent to the drum wall, and means to move the conveyer endwise through the drum.

2. A forming machine for plastic masses comprising a rotating hollow drum and a continuous surfaced conveyer passing therethrough adjacent to the drum-wall, said conveyer being set at an incline transversely downward to the drum-wall; means to move the conveyer endwise through the drum; and means to vary the relative directions of movements of the conveyer and the drum.

3. A forming machine for plastic masses comprising two continuously moving elements having surfaces arranged in V-shaped relation to each other, one of said surfaces moving horizontally and being exposed vertically and adapted to underlie and carry a mass upon itself through the apparatus; and the other, moving continuously in a vertical direction, being adjacent to the course of said horizontal motion and adapted to act upon the mass thereon; the horizontally moving element having its said carrying surface inclined transversely downward toward the vertically moving surface, to form said V-shape, whereby gravity maintains said mass on the horizontally moving surface and in contact with the vertically moving surface, and the latter surface maintains the mass above the horizontally moving surface.

4. A forming machine for plastic masses comprising a rotating hollow drum and an endless belt and means to guide the belt through the drum in both longitudinal directions thereof, the oppositely moving portions of the belt being arranged and adapted with respect to the drum interior wall whereby each of said portions of the belt may engage a plastic mass between itself and the portion of drum-wall adjacent to itself.

Signed by me at Boston, Massachusetts, this 4th day of August, 1909.

GÜNTHER H. PETRI.

Witnesses:
EVERETT E. KENT,
JOSEPH T. BRENNAN.